(12) United States Patent
Li et al.

(10) Patent No.: US 8,597,818 B2
(45) Date of Patent: Dec. 3, 2013

(54) LITHIUM ION BATTERY

(75) Inventors: Jian-Jun Li, Beijing (CN); Xiang-Ming He, Beijing (CN); Li Wang, Beijing (CN); Min Chen, Beijing (CN); Jian Gao, Beijing (CN); Chang-Yin Jiang, Beijing (CN); Li-Chun Zhang, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 90 days.

(21) Appl. No.: 13/337,015

(22) Filed: Dec. 23, 2011

(65) Prior Publication Data
US 2013/0004826 A1   Jan. 3, 2013

(30) Foreign Application Priority Data
Jun. 30, 2011  (CN) .......................... 2011 1 0181638

(51) Int. Cl.
  *H01M 2/16*    (2006.01)
(52) U.S. Cl.
  USPC .......................................... 429/144; 429/129
(58) Field of Classification Search
  USPC .................................................. 429/144, 129
  See application file for complete search history.

(56) References Cited

U.S. PATENT DOCUMENTS 7,326,498 B2   2/2008   Park et al.

FOREIGN PATENT DOCUMENTS

| JP | 2007220475 A | * | 8/2007 |
|---|---|---|---|
| JP | 2009146610 A | * | 7/2009 |
| JP | 2011113792 A | * | 6/2011 |
| WO | WO 2008020850 A1 | * | 2/2008 |

OTHER PUBLICATIONS

Yoshizawa et al., "An Application of Lithium Cobalt Nickel Manganese Oxide to High-Power and High-Energy Density Lithium-Ion Batteries", J. of Power Sources, vol. 174, Issue 2, pp. 813-817 (available onlone Jun. 28, 2007).*
IPDL Machine Translation of the Detailed Description of JP 2009-146610A (Jul. 2009).*
"Correlation between AlPO4 nanoparticle coating thickness on LiCoO2 cathode and thermal stablility", J.Cho, Electrochimica Acta 48 (2003) 2807-2811.

* cited by examiner

*Primary Examiner* — Gregg Cantelmo
(74) *Attorney, Agent, or Firm* — Altis & Wispro Law Group, Inc.

(57) ABSTRACT

The present disclosure relates to a lithium ion battery. The lithium ion battery cathode includes a cathode, a separator, an anode, and a nonaqueous electrolyte solution. The cathode includes a cathode current collector and a cathode material layer disposed on a surface of the cathode current collector. The cathode material layer comprises cathode active material, conductive agent, and adhesive uniformly mixed together. The cathode active material comprises cathode active material particles and $AlPO_4$ layers coated on surfaces of the cathode active material particles. The separator includes a porous membrane and a protective layer coated on a surface of the porous membrane. The protective layer prevents the separator from being melted during charging or discharging of the lithium ion battery.

19 Claims, 11 Drawing Sheets

LITHIUM ION BATTERY

CROSS-REFERENCE TO RELATED APPLICATIONS

This application claims all benefits accruing under 35 U.S.C. §119 from China Patent Application No. 201110181638.6, filed on Jun. 30, 2011, in the China Intellectual Property Office, the contents of which are hereby incorporated by reference.

BACKGROUND

1. Technical Field

The present disclosure relates to a lithium ion battery.

2. Description of Related Art

Presently, the demand of high power and high energy density lithium ion batteries is growing with the rapid development of electric vehicles and portable electronic devices, such as mobile phones, digital cameras and notebook computers.

A typical lithium ion battery includes a cathode, an anode, a separator, and an electrolyte. In practical applications, lithium ion battery has many security risks. For example, material in the lithium ion battery is easily decomposed and release heat when the lithium ion battery is overcharged, as an internal temperature of the lithium ion battery tends to rapidly increase and causes burning and explosion of the lithium ion battery. Thus, the application of the lithium ion battery is limited.

Commonly, a protective circuit is used to prevent the lithium ion battery from being damaged. However, the protective circuit is complex. Furthermore, when the protective circuit is damaged, the security risks remains.

What is needed, therefore, is to provide a lithium ion battery having an improved security.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
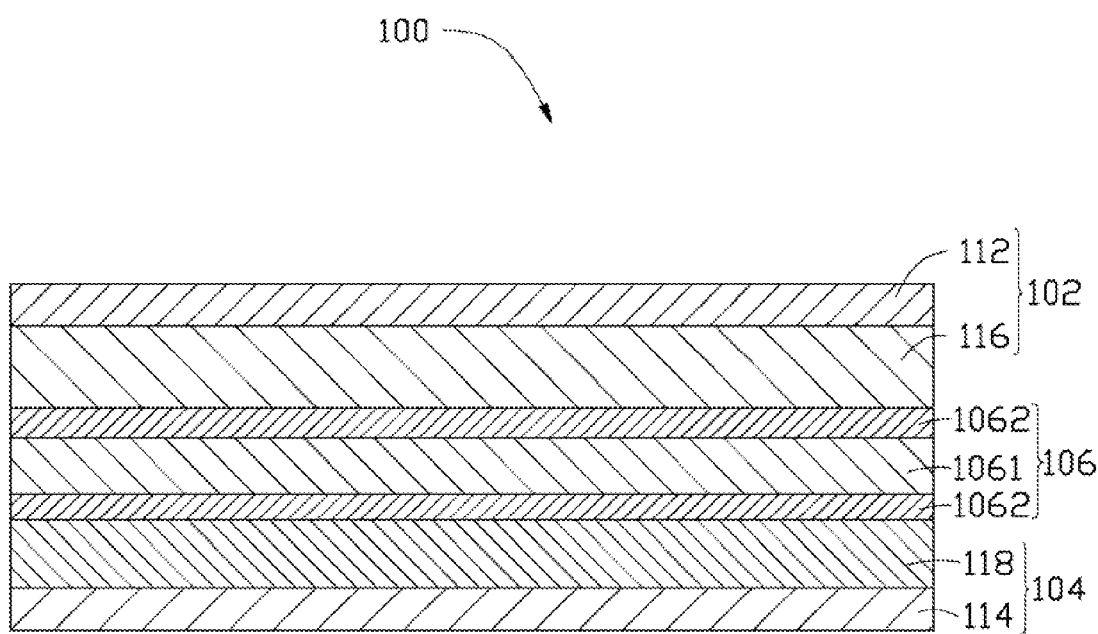
FIG. 1 is a structural schematic view of one embodiment of a lithium ion battery.

Referring to FIG. 1, one embodiment of a lithium ion battery 100 includes a cathode 102, an anode 104, a separator 106, a nonaqueous electrolyte solution, and an external encapsulating shell. The cathode 102, anode 104, separator 106 and nonaqueous electrolyte solution are encapsulated in the encapsulating shell. The cathode 102 and the anode 104 are stacked with each other. The separator 106 is located between the cathode 102 and the anode 104. The cathode 102 and the anode 104 can be in contact with the separator 106.

The cathode 102 includes a sheet shaped cathode current collector 112 and a cathode material layer 116 disposed on a surface of the cathode current collector 112. The anode 104 includes a sheet shaped anode current collector 114 and an anode material layer 118 disposed on a surface of the anode current collector 114.

In one embodiment, the cathode 102 includes two cathode material layers 116 disposed on two opposite surfaces of the cathode current collector 112, and the anode 104 includes two anode material layers 118 disposed on two opposite surfaces of the anode current collector 114. The cathode material layers 116 and the anode material layers 118 are respectively disposed on two opposite surfaces of the separator 106 and spaced from each other by the separator 106. Both the cathode material layers 116 and the anode material layers 118 are attached to the separator 106. Furthermore, the cathode current collector 112 has a cathode terminal tab protruding from the cathode material layer 116, and the anode current collector 114 has an anode terminal tab protruding from the anode material layer 118. The cathode terminal tab and the anode terminal tab are used to electrically connect the cathode current collector 112 and the anode current collector 114 to an external circuit.

The cathode current collector 112 and the anode current collector 114 can be made of metal foil. In some embodiments, the cathode current collector 112 can be titanium foil or aluminum foil. The anode current collector 114 can be copper foil or nickel foil. A thickness of the cathode current collector 112 and the anode current collector 114 can be in a range from about 1 μm (micrometer) to about 200 μm. The cathode material layer 116 includes a mixture containing cathode active material, conductive agent, and adhesive uniformly mixed together. The anode material layer 118 includes a mixture containing anode active material, conductive agent, and adhesive uniformly mixed together. The conductive agent can be graphite, acetylene black, carbon fiber or carbon nanotubes. The adhesive can be polyvinylidene fluoride (PVDF), styrene-butadiene rubber (SBR) or polytetrafluoroethylene (PTFE).

Figure 2:
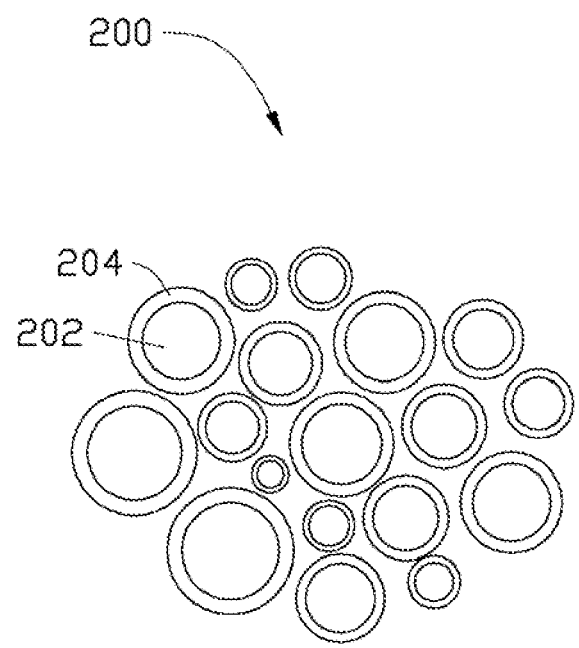
FIG. 2 is a structural schematic view of a cathode active material of the lithium ion battery of the FIG. 1.

Referring to FIG. 2, the cathode active material 200 includes cathode active material particles 202 and $AlPO_4$ layers 204. The $AlPO_4$ layer 204 is coated on a surface of the cathode active material particle 202. A mass percentage of the $AlPO_4$ layers 204 to the cathode active material particles 202 can be in a range from about 0.1% to about 3%. A thickness of the AlPO$_4$ layer 204 can be in a range from about 5 nanometers (nm) to about 20 nm. An interfacial diffusion may occur at the interface between the AlPO$_4$ layer 204 and the cathode active material particle 202, and the AlPO$_4$ in the AlPO$_4$ layer 204 may partially diffuse into the cathode active material particle 202. Thus, the AlPO$_4$ layer 204 and the cathode active material particle 202 can be stably combined. The AlPO$_4$ layer 204 is an in situ formed layer on the surface of the cathode active material particle 202. The AlPO$_4$ layer 204 is a continuous material layer of AlPO$_4$ having a uniform thickness.

The cathode active material 200 can be prepared by the following steps:
- S1, introducing a plurality of cathode active material particles 202 into a Al(NO$_3$)$_3$ solution, and mixing the plurality of cathode active material particles 202 with the Al(NO$_3$)$_3$ solution to form a mixture;
- S2, adding a phosphorus source solution containing phosphate radical into the mixture to react with the Al(NO$_3$)$_3$ solution, thereby forming the AlPO$_4$ layers 204 on surfaces of the cathode active material particles 202; and
- S3, heat treating the cathode active material particles 202 with the AlPO$_4$ layer 204 formed on the surfaces thereof.

In the step S1, the mixture can be pasty. The pasty mixture can be formed when the amount of the Al(NO$_3$)$_3$ solution is just enough to coat the entire surfaces of the cathode active material particles 202. The pasty mixture can be formed by controlling a volumetric ratio of the Al(NO$_3$)$_3$ solution and the cathode active material particles 202. In step S2, the phosphate radical can be phosphate ion (PO$_4^{3-}$), dihydrogen phosphate ion (H2PO$_4^-$), hydrogen phosphate ion (HPO$_4^{2-}$), or combinations thereof. A uniform AlPa$_4$ layer 204 can be in situ formed on the surface of the cathode active material particle 202. In the step S3, the heat treating step can firmly combine the AlPO$_4$ layer 204 and the cathode active material particle 202 at the interfaces therebetween, to form the cathode active material 200. Meanwhile, the residual reacting by-products can be removed from the final product. In addition, interface diffusion between the AlPO$_4$ layer 204 and the cathode active material particle 202 may be occurred during the heat treating.

In the cathode active material 200 prepared by the above method, the AlPO$_4$ layer 204 is an integrated and continuous material layer having uniform thickness, not just a plurality of AlPO$_4$ particles joined together. In the lithium ion battery, the AlPO$_4$ layer 204 can prevent an electron migration between the electrolyte and the cathode active material particles 202 and allow the lithium ions to pass through. Thus, the side reaction during the charge and discharge of the lithium ion battery between the electrolyte and the cathode active material particles 202 can be suppressed. Therefore, the cathode active material 200 has improved chemical and thermal stabilities, even at a relatively high or low charge/discharge voltage, or a high rate.

The cathode active material particles 202 can be made of doped or undoped spinel lithium manganese oxide, layered lithium manganese oxide, lithium nickel oxide, lithium cobalt oxide, lithium iron phosphate, lithium nickel manganese oxide, lithium nickel cobalt oxide, or any combination thereof. Specifically, the formula of the spinel lithium manganese oxide can be Li$_x$Mn$_{2-y}$L$_y$O$_4$. The formula of the lithium nickel oxide can be Li$_x$Ni$_{1-y}$L$_y$O$_2$. The formula of the lithium cobalt oxide can be Li$_x$Co$_{1-y}$L$_y$O$_2$. The formula of the layered lithium manganese oxide can be Li$_x$Mn$_{1-y}$L$_y$O$_2$. The formula of the lithium iron phosphate can be Li$_x$Fe$_{1-y}$L$_y$PO$_4$. The formula of the lithium nickel manganese oxide can be Li$_x$Ni$_{0.5+z-a}$Mn$_{1.5-z-b}$L$_a$R$_b$O$_4$. The formula of the lithium nickel cobalt manganese oxide can be Li$_x$Ni$_c$Co$_d$Mn$_e$L$_f$O$_2$. In the above formulas, 0.1≤x≤1.1, 0≤y≤1, 0≤z<1.5, 0≤a-z<0.5, 0≤b+z<1.5, 0<c<1, 0<d<1, 0<e<1, 0≤f≤0.2, and c+d+e+f=1. L and R represent at least one of the chemical elements of alkali metal elements, alkaline-earth metal elements, Group-13 elements, Group-14 elements, transition metal elements, and rare-earth elements. In one embodiment, L and R represent at least one of the chemical elements of Mn, Ni, Cr, Co, V, Ti, Al, Fe, Ga, Nd, and Mg.

The separator 106 includes a porous membrane 1061 and a protective layer 1062 coated on a surface of the porous membrane 1061. The protective layer 1062 prevents the porous membrane 1061 from melting due to the heat produced during the charge and discharge of the lithium ion battery. The protective layer 1062 includes a dried reaction product fabricated from a phosphorous source having a phosphate radical, a trivalent aluminum source, and a metallic oxide mixed in a liquid phase solvent.

The porous membrane 1061 can be commonly used separators of the lithium ion battery, such as a pure polymer separator, a ceramic separator, or a polymer based separator having ceramic materials therein. A thickness of the porous membrane 1061 can be in a range from about 5 microns to about 60 microns. A porosity of the porous membrane 1061 can be in a range from about 20% to about 90%. A diameter of the porous membrane 1061 can be in a range from about 0.01 microns to about 80 microns. In one embodiment, the thickness of the porous membrane 1061 is in a range from about 15 microns to about 40 microns, the porosity of the porous membrane 1061 is in a range from about 40% to about 80%, and the diameter of the porous membrane 1061 is in a range from about 0.1 microns to about 10 microns. The porous membrane 1061 can be fabricated by melt-spinning-cold stretching method (MSCS) and thermally induced phase separation method (TIPS).

The protective layer 1062 is a continuous layer structure coated on two opposite surfaces of the porous membrane 1061. A thickness of the protective layer 1062 can be in a range from about 10 nm to about 100 nm. In one embodiment, the thickness of the protective layer is in a range from about 10 nm to about 40 nm.

The protective layer 1062 can be fabricated by the following steps:
- M1, providing the phosphorus source having the phosphate radical, the trivalent aluminum source and the metallic oxide;
- M2, mixing the phosphorus source having the phosphate radical, the trivalent aluminum source, and the metallic oxide in a liquid phase solvent to form a clear solution;
- M3, coating the clear solution on the surface of the porous membrane 1061 to form a coating layer; and
- M4, drying the coated porous membrane 1061 to form the protective layer 1062 disposed on the surface of the porous membrane 1061.

In the step M1, the phosphate radical can be phosphate ion (PO$_4^{3-}$), dihydrogen phosphate ion (H$_2$PO$_4^-$), hydrogen phosphate ion (HPO$_4^{2-}$), or combinations thereof. The phosphorus source can be monoammonium phosphate (NH$_4$H$_2$PO$_4$), diammonium phosphate ((NH$_4$)$_2$HPO$_4$), ammonium phosphate ((NH$_4$)$_3$PO$_4$), phosphoric acid (H$_3$PO$_4$), aluminum phosphate (AlPO$_4$), aluminum dihydrogen phosphate (Al(H$_2$PO$_4$)$_3$), dialuminum hydrogen phosphate (Al$_2$(HPO$_4$)$_3$) or combinations thereof. The trivalent aluminum source can be at least one of aluminum hydroxide (Al(OH)$_3$), aluminum oxide (Al$_2$O$_3$), aluminum nitrate (Al(NO$_3$)$_3$), AlPO$_4$, Al(H$_2$PO$_4$)$_3$, and Al$_2$(HPO$_4$)$_3$. The metallic oxide can be at least one of chromium trioxide ($CrO_3$), zinc oxide (ZnO), copper oxide (CuO), magnesium oxide (MgO), zirconium dioxide ($ZrO_2$), molybdenum trioxide ($MoO_3$), vanadium pentoxide ($V_2O_5$), niobium pentoxide ($Nb_2O_5$), and tantalum pentoxide ($Ta_2O_5$). The liquid phase solvent can be water or N-methyl-pyrrolidone (NMP). In one embodiment, a volume density of a total mass of the phosphate radical, the aluminum element and the metallic element to a volume of the clear solution (i.e., a mass of the phosphate radical+ a mass of the aluminum element+a mass of the metallic element/a volume of the clear solution) is in a range from about 0.02 grams per milliliter (g/ml) to about 0.08 g/ml. In one embodiment, a molar ratio of the trivalent aluminum source, the metallic oxide, and the phosphorus source is set by $(Mol_{Al}+Mol_{metal}):Mol_p=$ about 1:2.5 to about 1:4, wherein $Mol_{Al}$ is the amount of substance of the aluminum element in the trivalent aluminum source, $Mol_{metal}$ is the amount of substance of the metallic element in the metallic oxide, and $Mol_p$ is the amount of substance of the phosphorus element in the phosphorus source. In one embodiment, the $(Mol_{Al}+Mol_{Metal})Mol_p$ is in a range from about 1:2.5 to about 1:3.

In the step M3, the clear solution can be evenly coated on one or two surfaces of the porous membrane 1061 by methods such as brushing, spraying, electrostatic coating, roll coating, screen printing, or dip coating.

In the step M4, the liquid phase solvent of the clear solution can be removed by drying the coated porous membrane 1061. The formed protective layer 1062 can be well combined with the surface of the porous membrane 1061 due to a surface tension generated during removing the liquid phase solvent. The coated porous membrane 1061 can be dried by air drying or heat drying. A temperature of the heat drying process may be equal to or lower than 70° C.

The clear and sticky solution can be easily and evenly coated on the surface of the porous membrane 1061 to form a continuous and thin protective layer 1062. The existence of the protective layer 1062 will not decrease the porosity of the porous membrane 1061 and the lithium ion mobility in a lithium ion battery. Furthermore, the protective layer 1062 can increase the mechanical strength of the separator 106 but will not increase the brittleness of the separator 106. The protective layer 1062 of the separator 106 can be transformed to a continuous obstructing film to prevent the shrinkage of the separator 106 when its temperature reaches to or higher than 100° C. The thermal stability and the safety of the lithium ion battery 10 thus can be increased. The composition of the obstructing film can be at least one of $Al_xM_yPO_4$ and $Al_xM_y(PO_3)_3$. M represents at least one of the chemical elements of Cr, Zn, Mg, Zr, Mo, V, Nb, and Ta. A valence of M is represented by k, wherein 0<x<1, 0<y<1, and 3x+ky=3. In one embodiment, the composition of the obstructing film is at least one of $Al_xCr_{1-x}PO_4$ and $Al_xCr_{1-x}(PO_3)_3$.

The electrolyte solution includes an electrolyte and an organic solvent. The electrolyte can be lithium hexafluorophosphate ($LiPF_6$), lithium terafluoroborate ($LiBF_4$), lithium bis(oxalato)borate (LiBOB), or combinations thereof. The organic solvent can be ethylene carbonate (EC), diethyl carbonate (DEC), dimethyl carbonate (DMC), ethylmethyl carbonate (EMC), propylene carbonate (PC), or combinations thereof.

The external encapsulating shell can be a rigid battery shell or a soft encapsulating bag.

EXAMPLE

In an exemplary embodiment of the lithium ion battery 100, the cathode current collector 112 is the aluminum foil. The anode current collector 114 is a copper foil. The material of the cathode active material particles 202 in the cathode active material 200 is lithium nickel manganese cobalt oxide, and the formula of the lithium nickel manganese cobalt oxide is $LiNi_{1/3}CO_{1/3}Mn_{1/3}O_2$. The $AlPO_4$ layer 204 is an in situ formed layer on the surface of the cathode active material particle 202. In the method for fabricating the cathode active material 200, $Al(NO_3)_3$ is dissolved in ethanol to form the $Al(NO_3)_3$ solution. The lithium nickel manganese cobalt oxide particles are introduced to 0.16 mol/L of $Al(NO_3)_3$ solution. The $Al(NO_3)_3$ solution having lithium nickel manganese cobalt oxide particles therein are stirred to form a pasty mixture. A ratio of the volume of the $Al(NO_3)_3$ solution to the mass of the lithium nickel manganese cobalt oxide particles is 3:10. Water solution of $(NH_4)_2HPO_4$ is added to the pasty mixture drop by drop. Then, the mixture is uniformly stirred until the $AlPO_4$ is completely precipitated on the surface of the lithium nickel manganese cobalt oxide particles. The lithium nickel manganese cobalt oxide particles coated by the $AlPO_4$ layer 204 are heated at about 600° C. In the fabricated cathode active material 200, the mass ratio of the $AlPO_4$ layer 204 is 1.5%.

In the method for fabricating the protective layer 1062 of the separator 106, 34.5 g of $H_3PO_4$ having a concentration of 85% and 14 g of deionized water are mixed to form a solution in a container. The solution is magnetically stirred at about 80° C. for about 5 minutes. 5.9 g of $Al(OH)_3$ powders are then added in the solution to react with the $H_3PO_4$ for about 2 hours. A colloidal suspension is formed in the container. Furthermore, 2.5 g of $CrO_3$ powders are added in the colloidal suspension to react for about 2 hours, to achieve a red transparent solution. The porous membrane 1061 is completely immersed into the red transparent solution and then lifted out from the red transparent solution. The surface of the porous membrane 1061 is substantially perpendicular to the level of the red transparent solution during the lifting process. The porosity of the porous membrane 1061 is about 60%. The thickness of the porous membrane 1061 is about 7 microns. The electrolyte of the electrolyte solution is $LiPF_6$, the organic solvent is EC.

Figure 3:
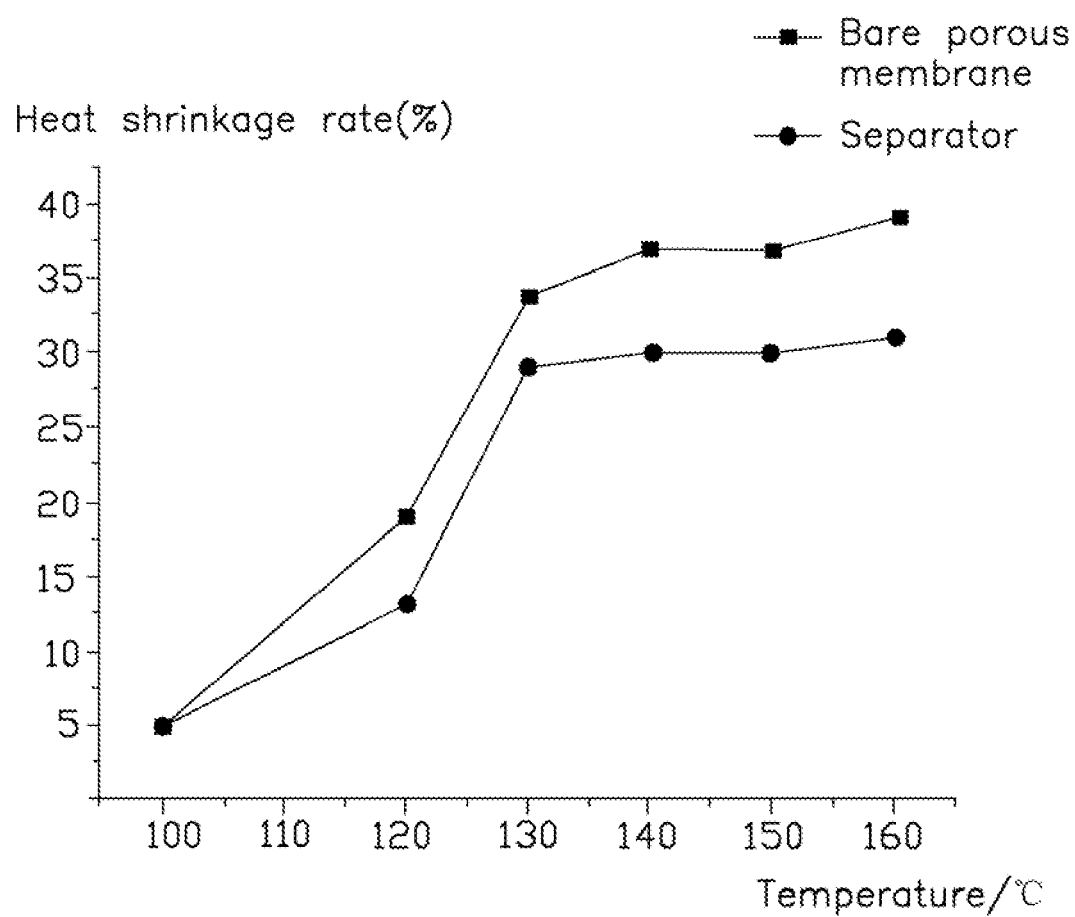
FIG. 3 is a test graph showing a comparison result of heat shrinkage of a separator of the lithium ion battery of FIG. 1 and a common separator.

Referring to FIG. 3, the separator 106 prepared in the example and the bare polypropylene porous membrane are both heated in the same condition at different temperatures for an hour to test their thermal shrinkage resistance. The heat shrinkage rates of the separator 106 and the bare polypropylene porous membrane are both extremely small along the width direction. The heat shrinkage rates along the length direction of the separator 106 and the bare polypropylene porous membrane are tested. The separator 106 of the example has a better thermal shrinkage resistance at different temperatures compared to the uncoated bare polypropylene porous membrane.

The lithium ion battery 100 is assembled by using the cathode active material 200 and the separator 106 formed in the Example. The cathode active material 200 formed in the example, acetylene carbon black as a conductive agent, and polyvinylidene fluoride (PVDF) as a binder are mixed to form a mixture. The mixture is applied to the surface of an aluminum foil to achieve the cathode material layer 116, thereby forming the cathode 102. The cathode 102, the anode 104, and the separator 106 are stacked with each other to assemble the lithium ion battery 100. A capacity of the lithium ion battery 100 is about 12 Ah, the energy density of the lithium ion battery 100 is about 180 Wh/kg, and the power density of the lithium ion battery 100 is about 2000 W/Kg.

Figure 4:
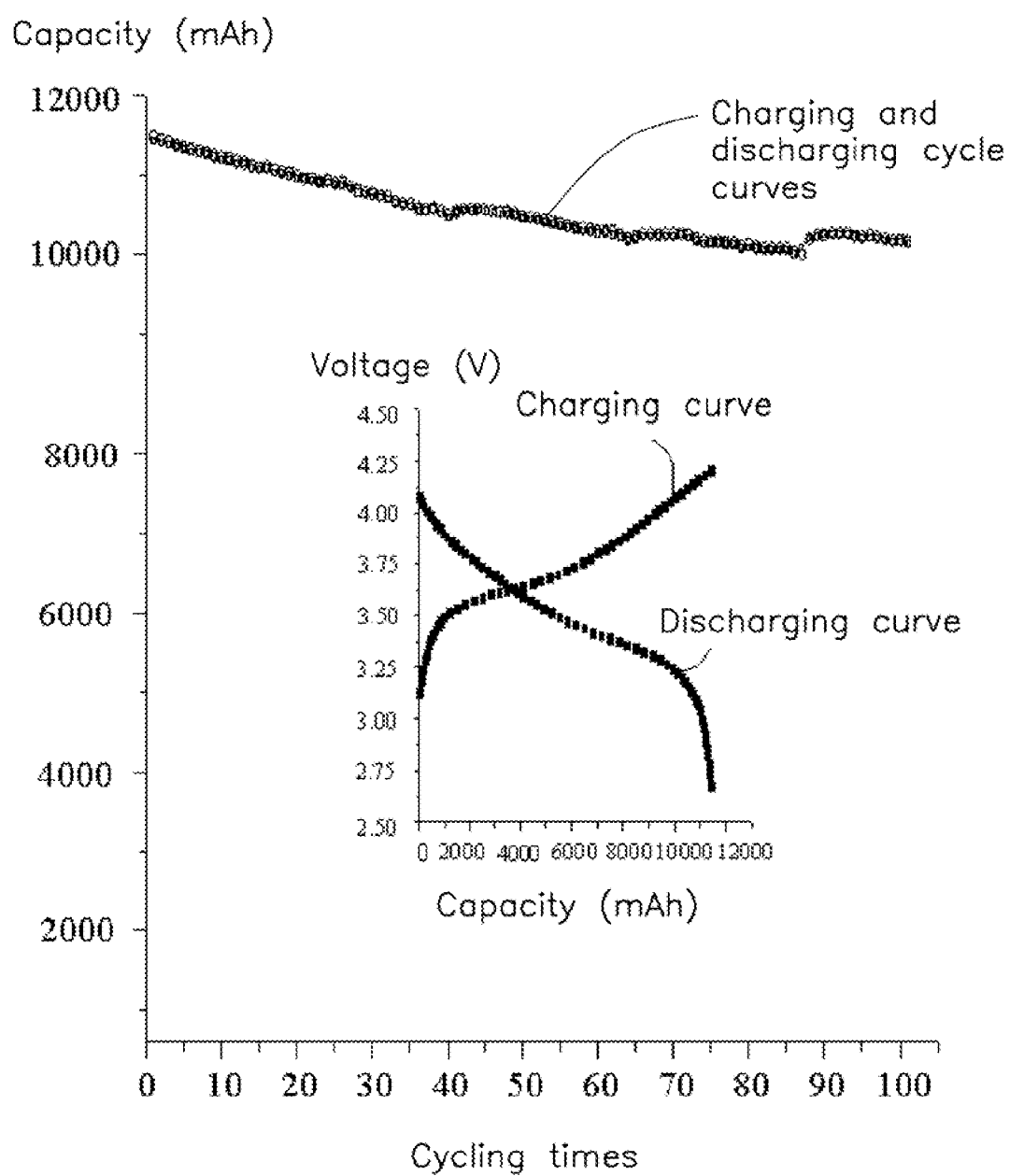
FIG. 4 is a test graph showing a cycling performance of the lithium ion battery of FIG. 1.
Figure 5:
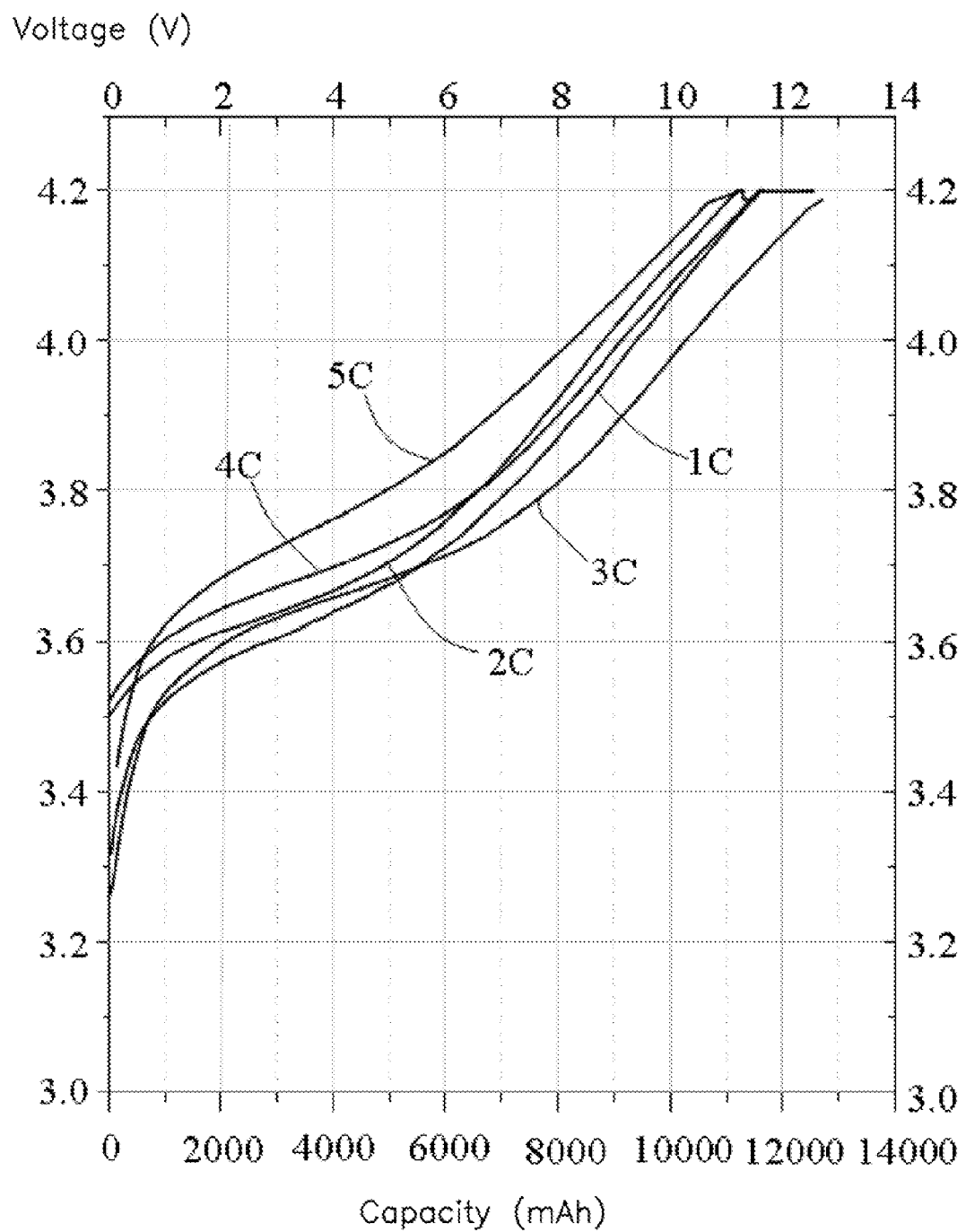
FIG. 5 is a test graph showing charge curves of the lithium ion battery of FIG. 1 under constant current and different rates.
Figure 6:
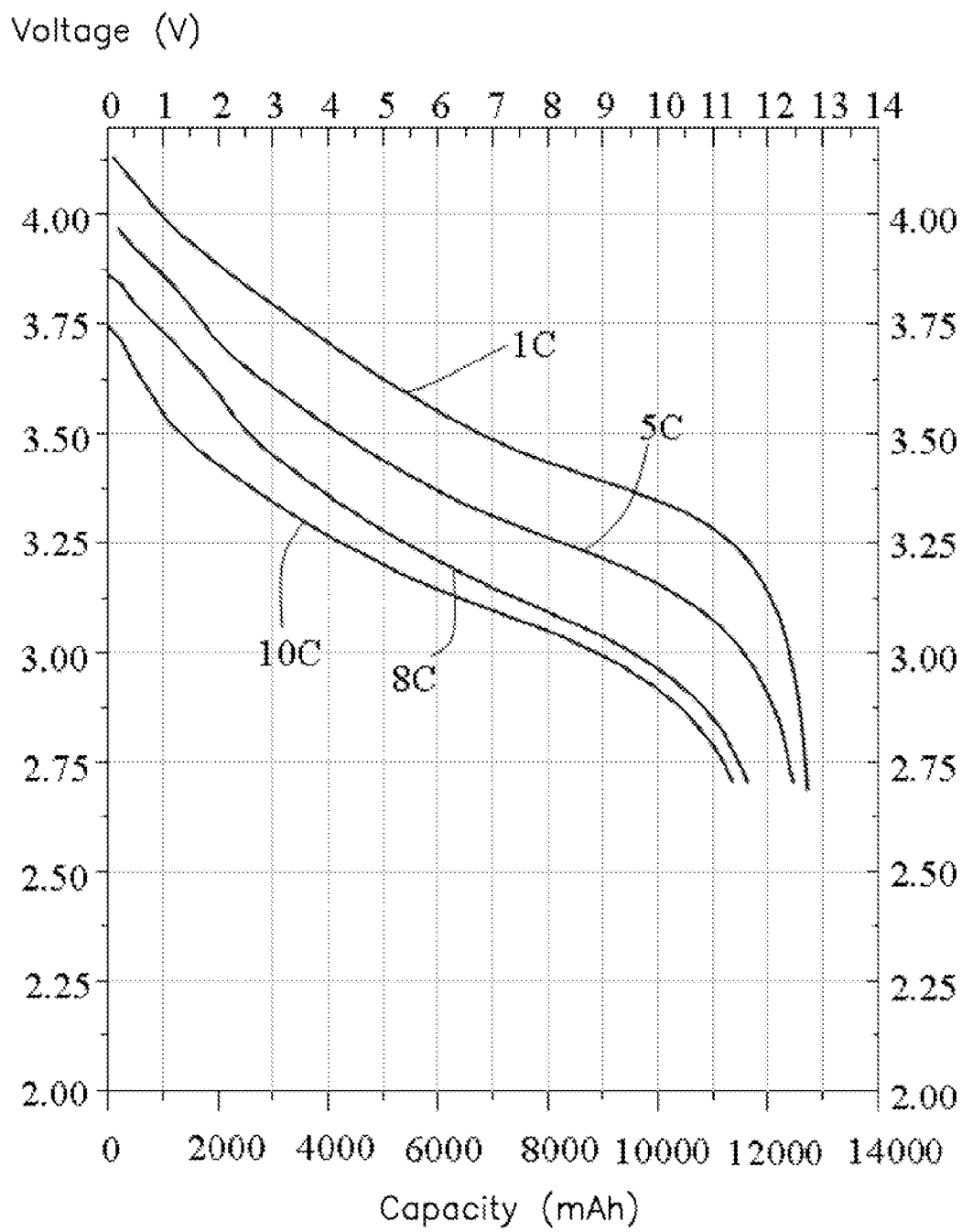
FIG. 6 is a test graph showing discharge curves of the lithium ion battery of FIG. 1 under constant current and different rates.

Referring to FIG. 4, the cycling property of the lithium ion battery 100 is tested. The lithium ion battery 100 is charged to about 4.2 V at a constant current of about 1.7 C, and the lithium ion battery 100 is discharged to about 2.7 V at a constant current of about 1.7 C. The capacity retention is larger than 90% when the lithium ion battery 100 is repeatedly charged or discharged for 100 times. Referring to FIG. 5, the lithium ion battery 100 is respectively charged at current of 1 C, 2 C, 3 C, 4 C and 5 C. The lithium ion battery 100 can be fully charged when the lithium ion battery 100 is charged for about 12 minutes at the current of 5 C, the temperature of the lithium ion battery 100 remains below 60° C. during the charging process. Referring to FIG. 6, the lithium ion battery 100 is respectively discharged at current of 1 C, 5 C, 8 C and 10 C. The temperature of the lithium ion battery 100 remains below 60° C. when the lithium ion battery 100 is rapidly discharged at the current of 10 C.

Figure 7:
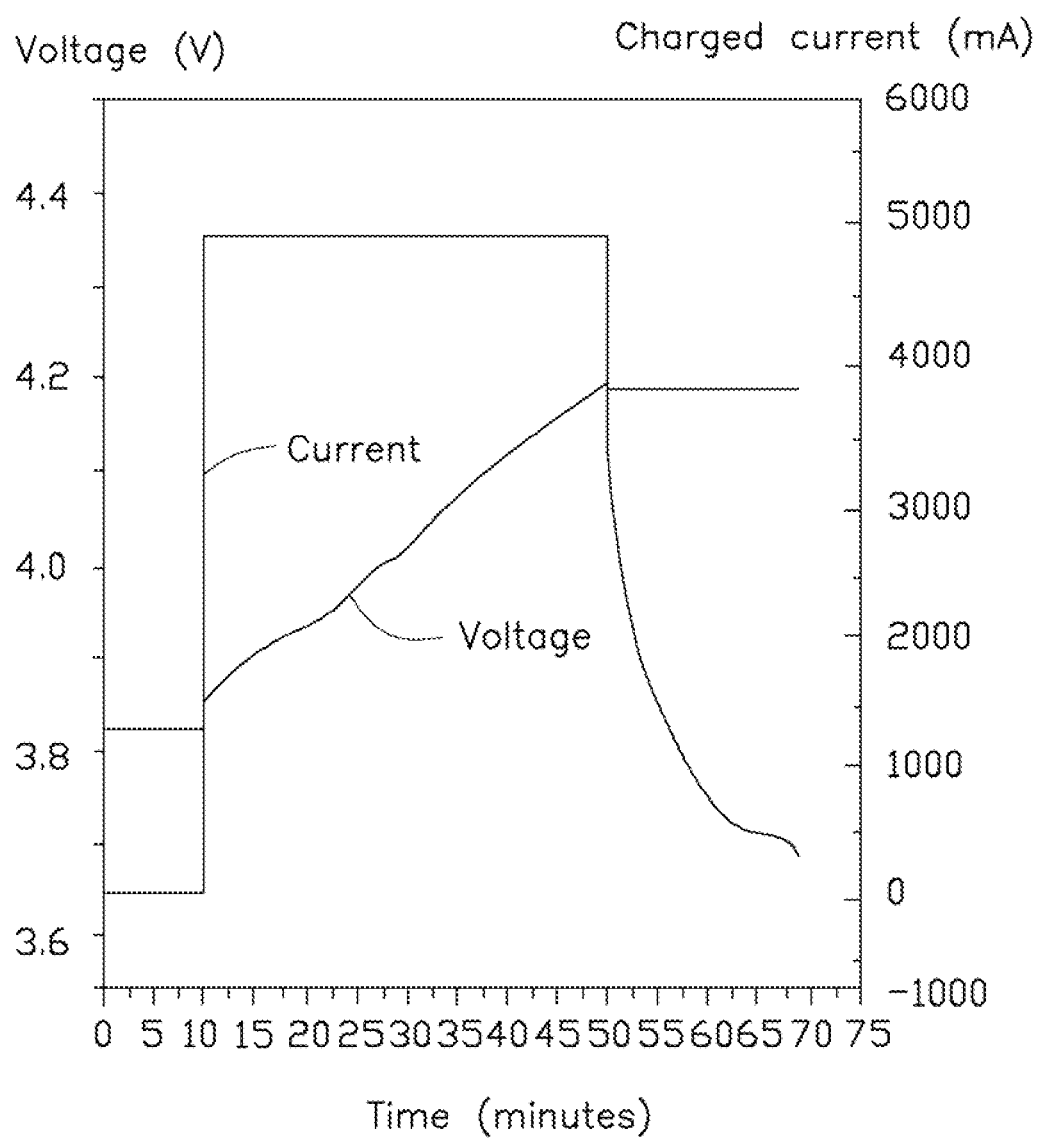
FIG. 7 is a test graph showing voltage and current change curves of the lithium ion battery of FIG. 1 during charging.
Figure 8:
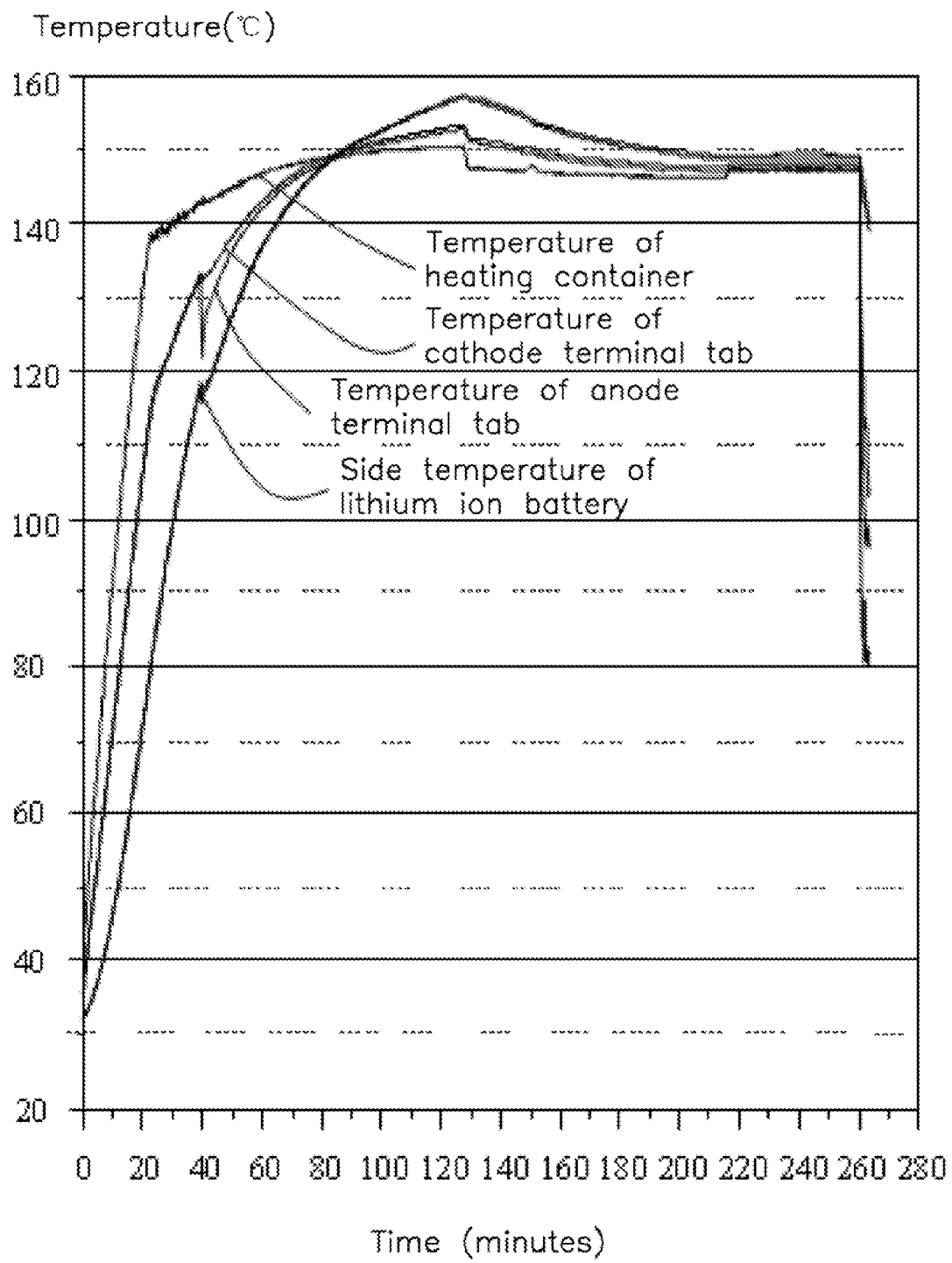
FIG. 8 is a test graph showing temperature change curves of different positions of the charged lithium ion battery of FIG. 1 at an elevated temperature.

Referring to FIGS. 7 and 8, after the lithium ion battery 100 is charged to 4.2 V, the charged lithium ion battery 100 is heated. The temperatures of the two sides, the cathode terminal tab, and the anode terminal tab of the lithium ion battery 100 and the temperature in the heating container used to heat the lithium ion battery 100 are tested during heating the lithium ion battery 100. The temperatures of the two sides, the cathode terminal tab, and the anode terminal tab of the lithium ion battery 100 are heated to about 150° C. for about 80 minutes. The temperatures of the two sides, the cathode terminal tab, and the anode terminal tab of the lithium ion battery 100 remain in a range from about 150° C. to about 155° C. when the lithium ion battery 100 is heated for 3 hours. The external encapsulating shell has a distortion without a burning phenomenon. Thus, the lithium ion battery 100 has an excellent thermal stability.

Figure 9:
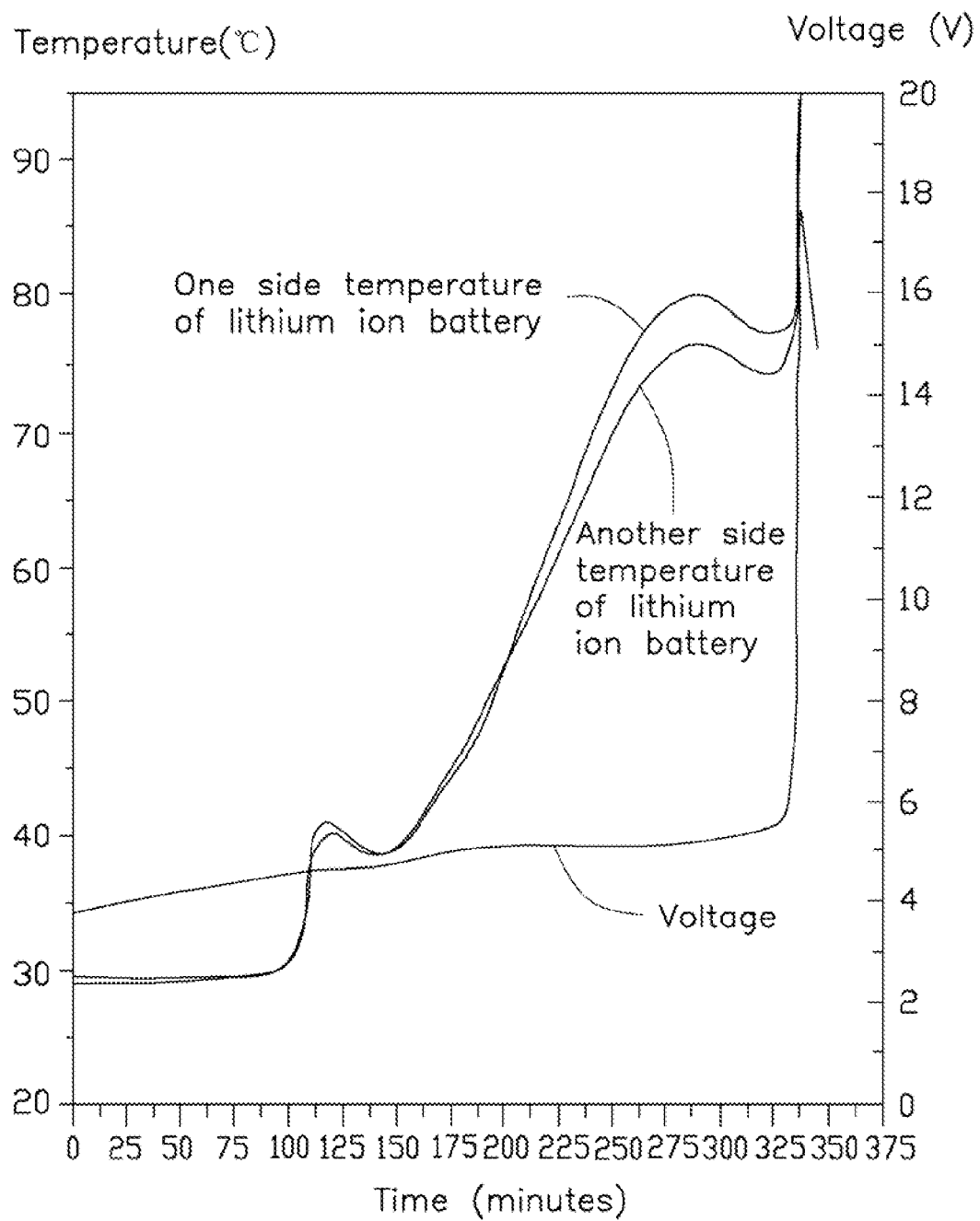
FIG. 9 is a test graph showing temperature change curves of different positions of the lithium ion battery of FIG. 1 during overcharging at 0.5 coulomb (C).

Referring to FIG. 9, the lithium ion battery 100 is overcharged at a current of 0.5 C. The temperatures of the two sides of the lithium ion battery 100 are tested during the charging process. The temperatures of the two sides of the lithium ion battery 100 achieve to 40° C. when the lithium ion battery 100 is charged to above 4.7 V. The temperatures of the two sides of the lithium ion battery 100 reach 80° C. when the lithium ion battery 100 is charged from 5 V to 20 V, and the lithium ion battery 100 does not has a burning phenomenon.

Figure 10:
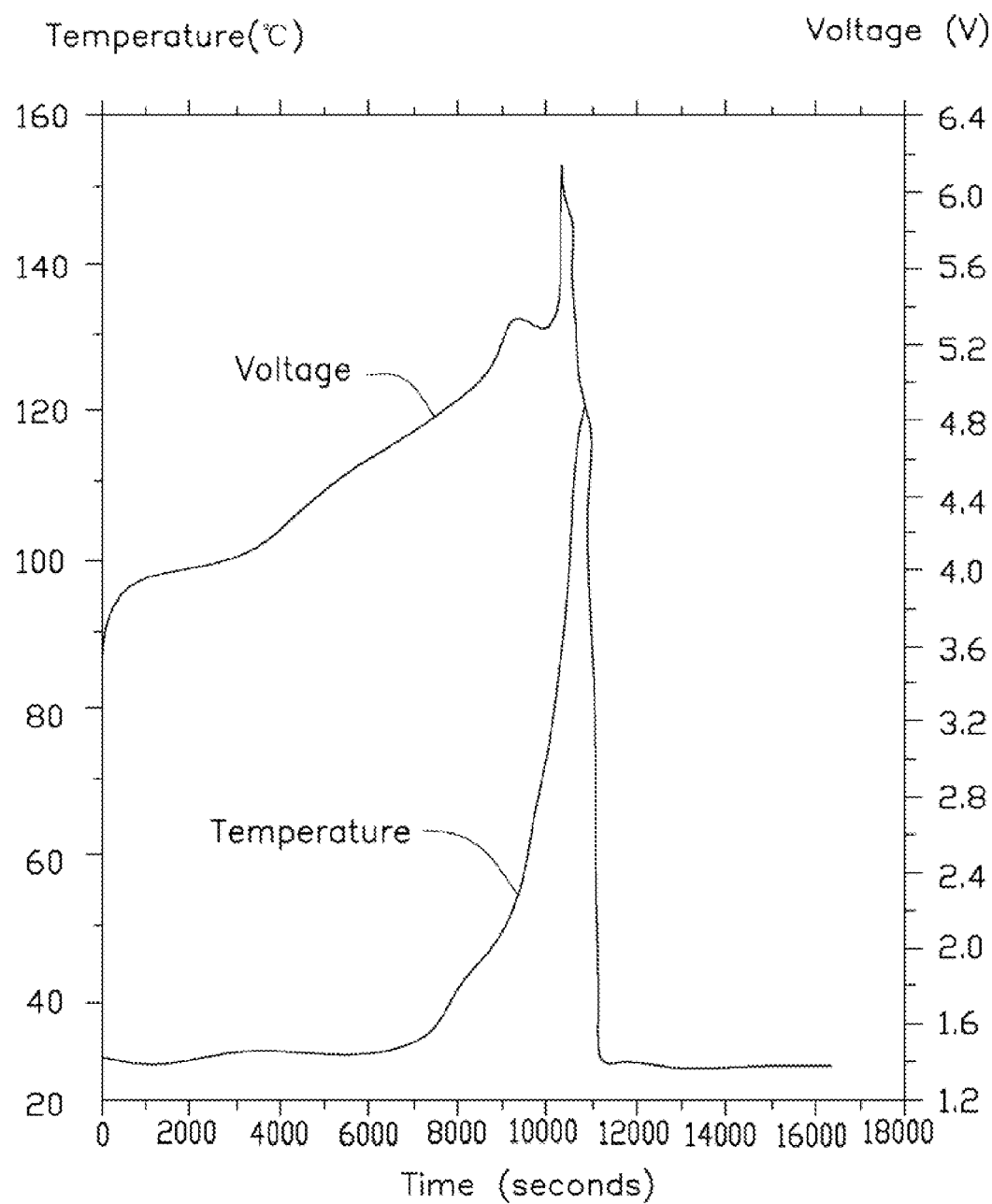
FIG. 10 is a test graph showing temperature change curve of the lithium ion battery of FIG. 1 during overcharging at 1C.

Referring to FIG. 10, the temperature of the lithium ion battery 100 gradually reaches to 80° C. when the lithium ion battery 100 is charged to beyond 5 V at a constant current of 1 C. The maximum temperature of the lithium ion battery 100 can reach 120° C. when the lithium ion battery 100 is overcharged, and the lithium ion battery 100 does not have a burning phenomenon. Thus, the lithium ion battery 100 has an excellent thermal stability and electrochemical stability due to the $AlPO_4$ layers 204 coating the surface of the cathode active material particles 202 and the protective layer 1062 coating the separator 106.

In the above example, a protective circuit is not connected with the above lithium ion battery 100.

Comparative Example

Figure 11:
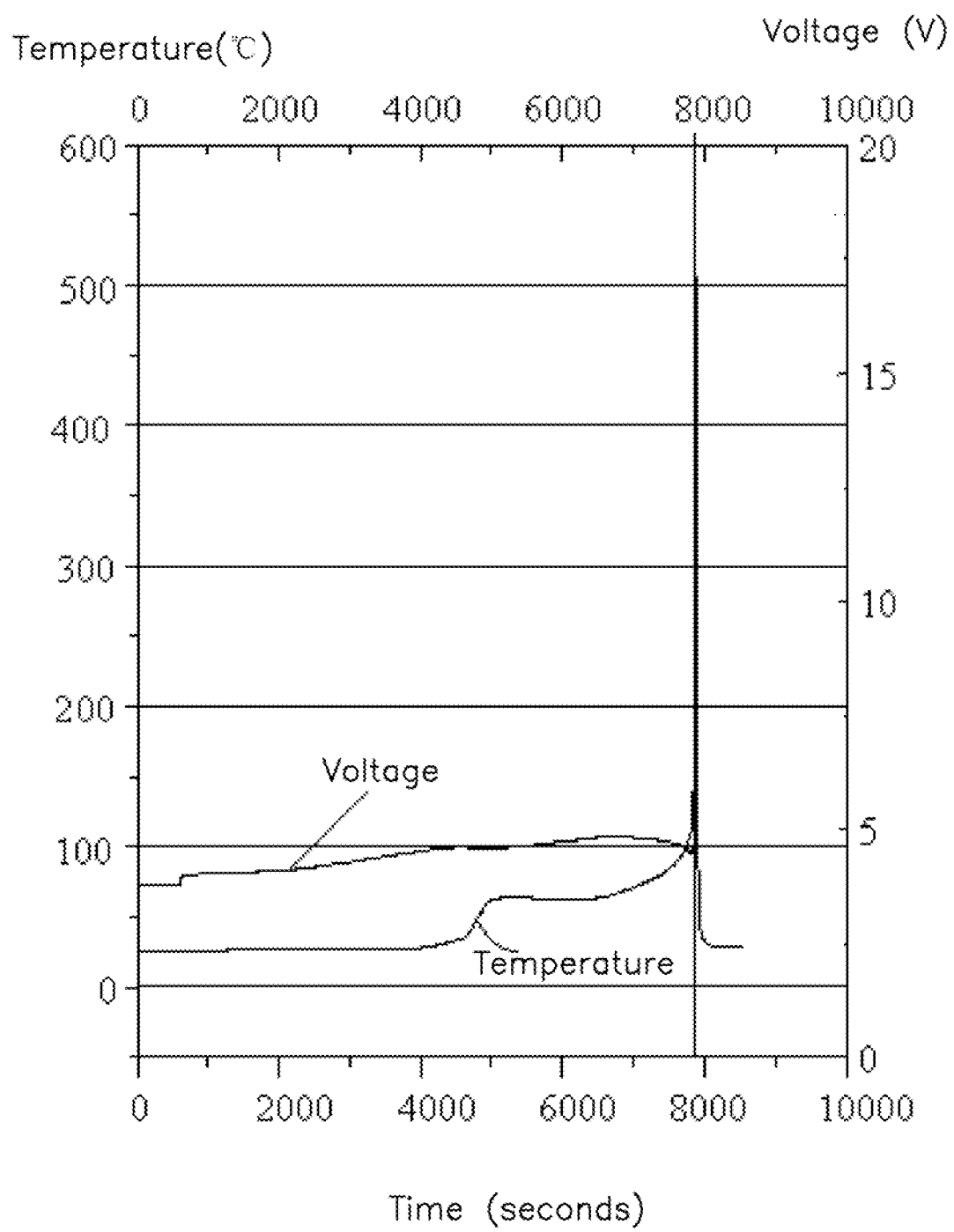
FIG. 11 is a test graph showing temperature change curve of a common lithium ion battery having a capacity of 600 mAh during overcharging at 1 C.

The thermal stability of a conventional lithium ion battery used in cell phone having a capacity of 600 mAh is tested. The protective circuit of the conventional lithium ion battery is unloaded. Referring to FIG. 11, the temperature of the conventional lithium ion battery gradually increases when the lithium ion battery 100 is overcharged beyond 5 V at a current of 1 C, The temperature of the conventional lithium ion battery rapidly increases and loses control when the temperature is greater than 150° C. The conventional lithium ion battery burns when the temperature of the conventional lithium ion battery increases to 520° C.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A lithium ion battery comprising:
   a cathode comprising a cathode current collector and a cathode material layer disposed on a surface of the cathode current collector, the cathode material layer comprises a cathode active material, a conductive agent, and an adhesive uniformly mixed together, the cathode active material comprises cathode active material particles and $AlPO_4$ layers coated on surfaces of the cathode active material particles;
   a separator comprising a porous membrane and a protective layer coated on a surface of the porous membrane, wherein the protective layer is configured to prevent the separator from being melted during charging or discharging of the lithium ion battery, and the protective layer comprises a dried reaction product fabricated from a phosphorous source having a phosphate radical, a trivalent aluminum source, and a metallic oxide mixed in a liquid phase solvent;
   an anode; and
   a nonaqueous electrolyte solution.

2. The lithium ion battery as claimed in claim 1, wherein the phosphorus source is selected from the group consisting of $NH_4H_2PO_4$, $(NH_4)_2HPO_4$, $(NH_4)_3PO_4$, $H_3PO_4$, $AlPO_4$, $Al(H_2PO_4)_3$, $Al_2(HPO_4)_3$ and combinations thereof.

3. The lithium ion battery as claimed in claim 1, wherein the trivalent aluminum source is selected from the group consisting of $Al(OH)_3$, $Al_2O_3$, $Al(NO_3)_3$, $AlPO_4$, $Al(H_2PO_4)_3$, $Al_2(HPO_4)_3$ and combinations thereof.

4. The lithium ion battery as claimed in claim 1, wherein the metallic oxide is selected from the group consisting of $CrO_3$, $ZnO$, $CuO$, $MgO$, $ZrO_2$, $MoO_3$, $V_2O_5$, $Nb_2O_5$, $Ta_2O_5$ and combinations thereof.

5. The lithium ion battery as claimed in claim 1, wherein the liquid phase solvent is water or N-methyl-pyrrolidone.

6. The lithium ion battery as claimed in claim 1, wherein a mass percentage of the $AlPO_4$ layers to the cathode active material particles is in a range from about 0.1% to about 3%.

7. The lithium ion battery as claimed in claim 1, wherein a thickness of each of the $AlPO_4$ layers is in a range from about 5 nm to about 20 nm.

8. The lithium ion battery as claimed in claim 1, wherein each of the $AlPO_4$ layers is coated on the surface of one of the cathode active material particles.

9. The lithium ion battery as claimed in claim 1, wherein each of the $AlPO_4$ layers is a continuous material layer having a uniform thickness and coats the whole surface of the cathode active material particle.

10. The lithium ion battery as claimed in claim 1, wherein the cathode active material particles are selected from the group consisting of doped or undoped spinel lithium manganese oxide, layered lithium manganese oxide, lithium nickel oxide, lithium cobalt oxide, lithium iron phosphate, lithium nickel manganese oxide, lithium nickel cobalt oxide, and any combination thereof.

11. The lithium ion battery as claimed in claim 1, wherein the protective layer is disposed on two opposite surfaces of the porous membrane.

12. The lithium ion battery as claimed in claim 1, wherein a thickness of the protective layer is in a range from about 10 nm to about 100 nm.

13. The lithium ion battery as claimed in claim 1, wherein a material of the porous membrane comprises polymer, ceramic, or any combination thereof.

14. A lithium ion battery comprising:
a cathode comprising a cathode current collector and a cathode material layer disposed on a surface of the cathode current collector, the cathode material layer comprises a cathode active material, a conductive agent, and an adhesive uniformly mixed together, the cathode active material comprises cathode active material particles and $AlPO_4$ layers coated on surfaces of the cathode active material particles, the cathode active material particles being lithium nickel cobalt manganese oxide particles;
a separator comprising a porous membrane and a protective layer coated on a surface of the porous membrane, wherein the protective layer is configured to prevent the separator from being melted during charging or discharging of the lithium ion battery, and the protective layer comprises a dried reaction product fabricated from a phosphorous source having a phosphate radical, a trivalent aluminum source, and a metallic oxide mixed in a liquid phase solvent;
an anode; and
a nonaqueous electrolyte solution.

15. The lithium ion battery as claimed in claim 14, wherein the protective layer comprises a dried reaction product fabricated from $AlPO_4$ and $CrO_3$ mixed in a liquid phase solvent.

16. A lithium ion battery comprising:
a cathode comprising a cathode current collector and a cathode material layer disposed on a surface of the cathode current collector, the cathode material layer comprises a cathode active material, a conductive agent, and an adhesive uniformly mixed together, the cathode active material comprising cathode active material particles and $AlPO_4$ layers coated on surfaces of the cathode active material particles;
a separator comprising a porous membrane and a protective layer coated on a surface of the porous membrane, wherein the protective layer is configured to prevent the separator from being melted during charging or discharging of the lithium ion battery, and a composition of the protective film is $Al_xM_y(PO_3)_3$, M represents at least one chemical element selected from the group consisting of Cr, Zn, Mg, Zr, Mo, V, Nb, and Ta, and a valence of M is represented by k, wherein $0<x<1$, $0<y<1$, and $3x+ky=3$;
an anode; and
a nonaqueous electrolyte solution.

17. The lithium ion battery of the claim 16, wherein the composition of the protective film consists of $Al_xCr_{1-x}(PO_3)_3$.

18. The lithium ion battery of the claim 16, wherein a molar ratio of an aluminum element, an M element, and a phosphorous element in the $Al_xM_y(PO_3)_3$ is set by $(Mol_{Al}+Mol_{Metal}):Mol_p$=about 1:2.5 to about 1:4, $Mol_{Al}$ is the amount of substance of the aluminum element, $Mol_{Metal}$ is the amount of substance of the M element, and $Mol_p$ is the amount of substance of the phosphorous element.

19. The modified current of the claim 18, wherein the molar ratio is in a range from about 1:2.5 to about 1:3.

* * * * *